June 29, 1965 R. A. GILMOUR 3,191,869
SPRAYING DEVICE HAVING RESTRICTED ORIFICE
AND EXPANSION CHAMBER CONSTRUCTION
Filed Nov. 7, 1961 2 Sheets-Sheet 1
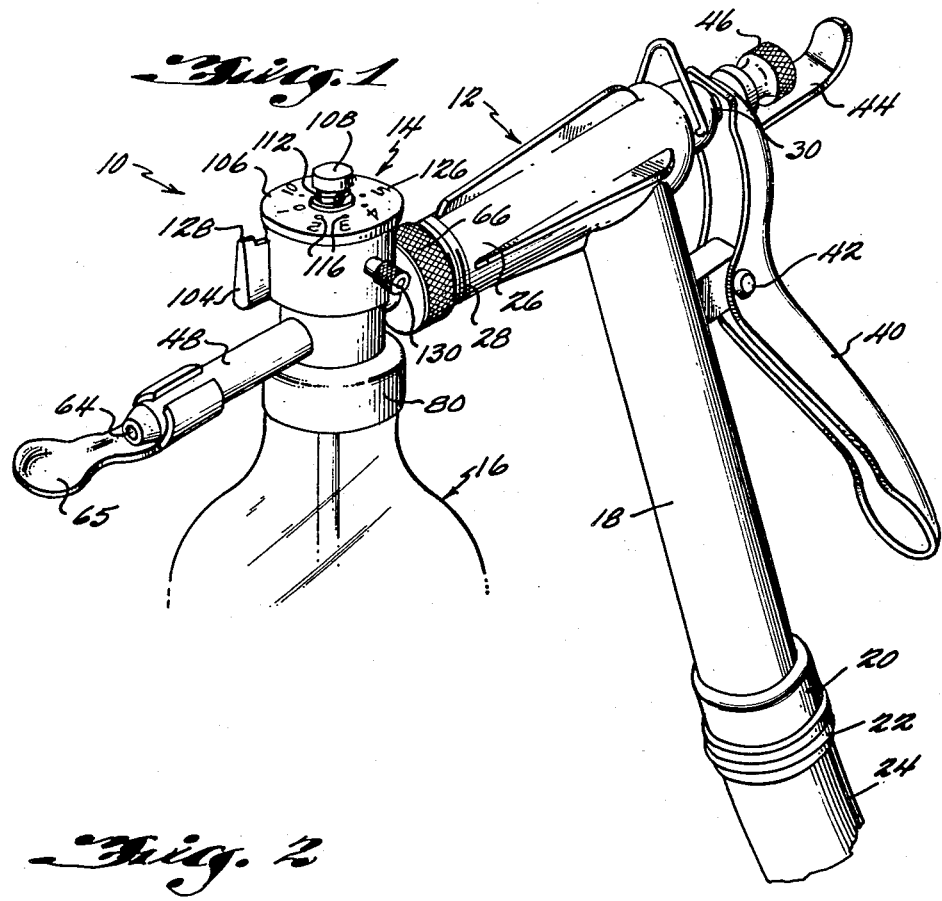
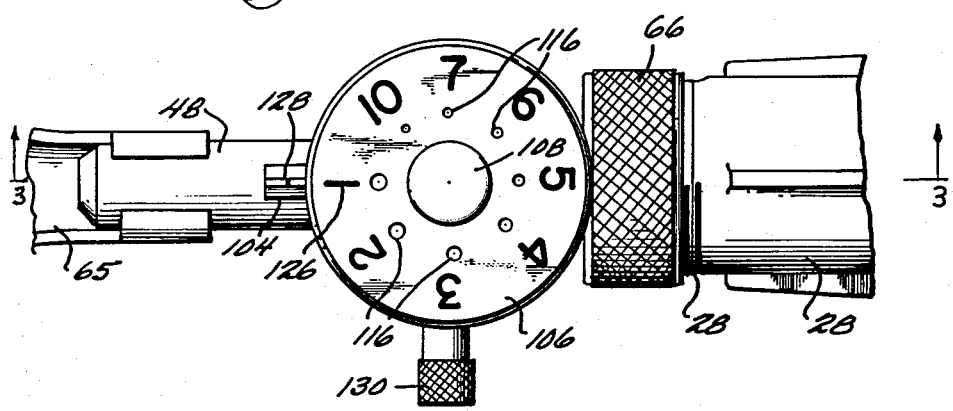
INVENTOR.
Robert A. Gilmour
BY
Cushman, Darby & Cushman
ATTORNEYS

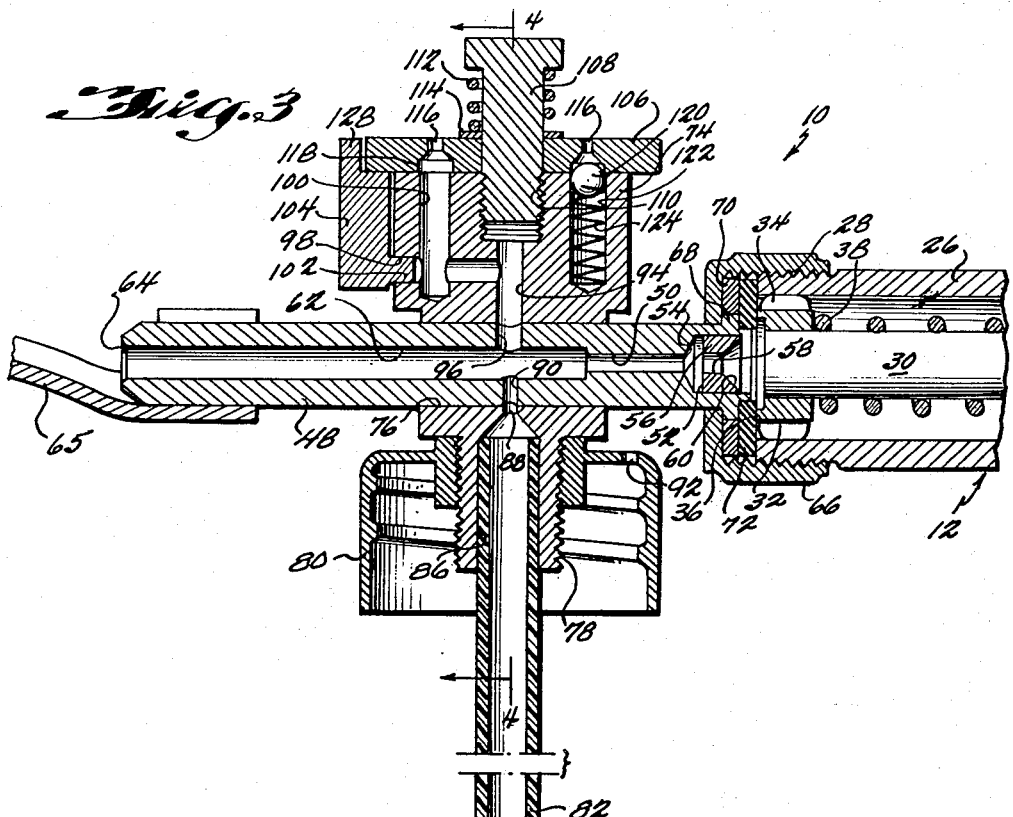
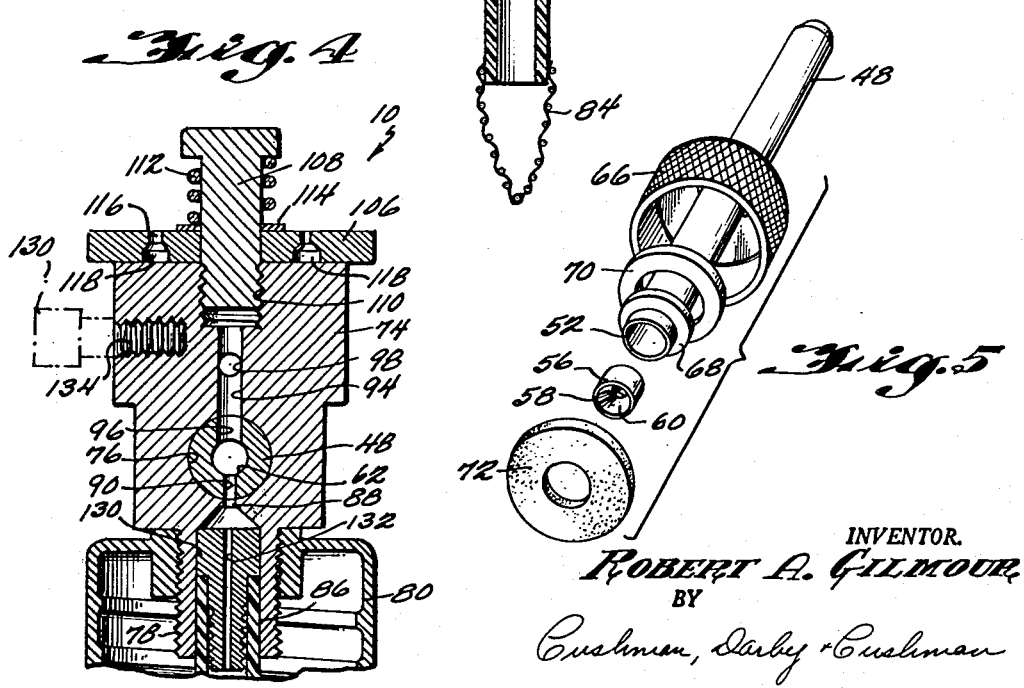

United States Patent Office
3,191,869
Patented June 29, 1965

3,191,869
SPRAYING DEVICE HAVING RESTRICTED ORIFICE AND EXPANSION CHAMBER CONSTRUCTION
Robert A. Gilmour, % Gilmour Manufacturing Co., Somerset, Pa.
Filed Nov. 7, 1961, Ser. No. 150,731
4 Claims. (Cl. 239—318)

This invention relates to sprayers and more particularly to spraying devices of the type adapted to mix a liquid treating chemical such as liquid insecticide, liquid fertilizer or the like, into a stream of water under pressure and discharge the mixture as a continuous spray, such as disclosed in my prior Patents 2,754,152; 2,788,244; and 2,788,245. This application is drawn to an improvement in the type of sprayer disclosed in my co-pending application Serial No. 108,864, now Patent No. 3,112,884.

In sprayers of the type disclosed in the above-entitled patents and applications, the amount of liquid insecticide or liquid fertilizer introduced into the stream of water under pressure is determined by the amount of vacuum or negative pressure created in the mixing chamber as a result of the velocity of the water stream passing therein. Thus, variation in the velocity of the water passing into the mixing chamber will result in a variation in the amount of liquid insecticide or fertilizer drawn into the stream but the variation is not necessarily a linear one. That is, a given increase in the velocity of water flow into the mixing chamber will not necessarily result in a proportional increase in the flow of liquid insecticide or liquid fertilizer into the mixing chamber. Because of this situation, the various settings of the sprayer head can be accurately calibrated to insure corresponding desired proportions of liquid insecticide or liquid fertilizer in the water stream for only one predetermined value of the source of water under pressure. If the particular source being utilized varies to any substantial extent from that to which the device has been calibrated, the accuracy of the particular settings will be detrimentally affected.

It is well-known that not only do the pressures in any one given source of water vary, but the normal water pressures as between different sources may vary to a considerable extent. For example, water pressure in certain cities may be normally maintained at a pressure greater than that maintained in other cities. Of course, as a practical matter, it is not possible to calibrate each sprayer differently depending upon the particular water source with which it is to be utilized. Heretofore it has been the practice to calibrate the sprayer heads for an average condition and in those areas which varied substantially from such average condition, the calibration accuracy of the sprayer heads was detrimentally affected to a substantial extent.

It is an object of the present invention to alleviate the above disadvantages by providing means in the sprayer for preventing any substantial increase in the velocity of the water entering the mixing chamber and hence any substantial decrease in the negative pressure created in the mixing chamber in response to increases in the pressure of the water source above a predetermined value. Of course, this predetermined value cannot be so low as to fail to generate a sufficient velocity of the water passing into the mixing chamber to create a negative pressure. That is, the predetermined pressure must be in the range wherein the liquid insecticide or liquid fertilizer will be aspirated into the water flow.

Another object of the present invention is the provision of a sprayer having means for substantially limiting the aspirating pressures created therein, which means is simple in construction and contains no moving parts, and is economical to manufacture.

Still another object of the present invention is the provision of a sprayer of the type described having improved valve means for varying the amount of air communicated with the mixing chamber to thereby determine the amount of liquid insecticide or liquid fertilizer drawn into the water stream.

Still another object of the present invention is the provision of a sprayer head of the type described which is simple in construction and economical to manufacture.

These and other objects of the present invention will become more apparent during the course of the following detailed description and appended claims.

The invention will best be understood with reference to the accompanying drawings wherein an illustrative embodiment is shown.

In the drawings:
FIGURE 1 is a perspective view of a sprayer device embodying the principles of the present invention;
FIGURE 2 is an enlarged, fragmentary, top plan view of the device shown in FIGURE 1;
FIGURE 3 is a cross-sectional view taken along the line 3—3 of FIGURE 2;
FIGURE 4 is a cross-sectional view taken along the line 4—4 of FIGURE 3; and
FIGURE 5 is an exploded view of certain parts of the sprayer head.

Referring now more particularly to the drawings, there is shown therein a sprayer device, generally indicated at 10, which embodies the principles of the present invention. In general, the device 10 comprises a hose nozzle, generally indicated at 12, having an inlet which is adapted to be connected to a source of water under pressure and a valve controlled outlet adapted to be connected with a sprayer head, generally indicated at 14. The sprayer head is adapted to receive a container, generally indicated at 16, for containing a supply of a liquid treating chemical to be mixed in the sprayer head 14 with the flow of water coming from the hose nozzle. The liquid treating chemical may be of any well-known composition for agricultural uses, such as liquid insecticides, liquid fertilizers and the like.

The hose nozzle 12 may be of any suitable construction and preferably is of the gun type, including an elongated handle portion 18 having a female hose fitting 20 formed on the lower end thereof for connection with a male fitting 22 such as the fitting shown in FIGURE 1 connected with a hose 24. The upper end of the handle portion 18 communicates with a hollow barrel portion 26, one extremity of which is exteriorly threaded, as indicated at 28. Extending through the opposite extremity of the barrel portion 26 is a valve stem 30 having a collar member 32 fixed to the inner end thereof. The collar member is provided with a plurality of circumferentially spaced guide fins 34 for engaging the interior cylindrical surface of the barrel portion 28 so as to maintain the adjacent portion of the stem 30 in accurately centered position during the reciprocal movement thereof. Formed on the forward surface of the collar member 32 is an annular ridge 36 which provides a valve seat.

The stem 30 is biased into its innermost position with respect to the barrel 26 by any suitable means, such as a coil spring 38. In order to effect movement of the stem against the action of the spring 38, there is provided a trigger or handle 40 which is pivoted to the handle portion 28 intermediate its ends, as indicated at 42. The handle extends above the pivot 42 and has a tab 44 bent outwardly therefrom to limit the upward movement of the operator's hand along the handle 40 and to provide an opening for receiving a knurled nut member 46 threadedly engaged on the outwardly extending end of the stem. It will be seen that by squeezing the lower portion of the trigger 40 and the handle portion 18, the valve stem will be reciprocated within the barrel portion of the nozzle.

The present invention is more particularly concerned with the construction of the sprayer head 14, the hose nozzle 12 merely serving as a convenient means for holding the sprayer head and for communicating and shutting off the flow of water under pressure through the sprayer head. The body of the sprayer head is preferably constructed in two parts of a metal such as brass or the like, although it will be understood that a one-piece construction or more than two parts may be utilized. As shown, the body comprises a water flow member 48 which is in the form of a cylinder having a restricted flow passage 50 formed therein. Formed in the member 48 adjacent the inlet end of the passage 50 is a counterbore 52 which forms a frusto-conical shoulder 54 with the passage 50. Rigidly mounted within the counterbore 52, as by a shrink fit or the like, is a cylindrical nozzle insert element 56 having a restricted flow orifice 58 formed therein. The inlet end of the orifice 58 is provided with a frusto-conical entrance as indicated at 60. Formed in the water flow member 48 adjacent the outlet end of the passage 50 is a bore which defines a mixing chamber 62 having a discharge opening 64 at its extremity. Mounted on the discharge end of the water flow member 48 is a deflector or diffuser member 65 having a portion disposed in the path of movement of the liquid issuing from the discharge opening 64 so as to deflect or direct the flow into a spray formation.

The water flow member 48 is connected with the hose nozzle 12 by any suitable means, such as a female hose fitting 66 which is internally threaded to engage the threads 28 on the barrel portion 26 of the hose nozzle. The central portion of the fitting 66 is apertured to receive the water flow member 48 and the latter is provided with an annular flange 68 for engaging the interior surface of the fitting. Fixed to the outer periphery of the flange, as by a shrink fit or the like, is a metallic washer 70 which, together with the flange 68, provides a surface for abuttingly receiving a conventional resilient washer 72, forming a valve for engagement by the valve seat 36 of the hose nozzle. It will be seen that when the valve seat 36 is in engagement with the washer, flow of water to the water flow member 48 will be closed off by the action of the hose nozzle. Flow is commenced and maintained by depressing the trigger 40 to move the valve seat 36 away from the washer 72.

The body of the sprayer head also includes a liquid control member 74 which conveniently may be in the form of a stepped cylinder. The intermediate portion of the liquid control member 74 is provided with a through bore 76 within which the water flow member 48 is fixedly mounted, as by a shrink fit or the like. The lower portion of the liquid control member 74 is exteriorly threaded, as indicated at 78, to receive a lid or cap 80, which receives and supports the container 16. The interior of the container is communicated with the mixing chamber 62 of the water flow member 48 by any suitable conduit means, such as a tube 82 formed of any suitable material, such as polyethylene or the like and having its open lower end disposed at the bottom of the container and preferably provided with a strainer 84. The upper end of the tube 82 is disposed within a counterbore 86 formed in the lower end of the liquid control member 78. The upper end of the counterbore communicates with a small bore or liquid passage 88 disposed in alignment with a passage 90 extending vertically upwardly through the flow member 48 into communication with the mixing chamber 62. In order to prevent the creation of a vacuum within the container 16 during operation, a vent hole 92 is formed in the upper portion of the lid or cap 80.

The liquid control member 74 is also provided with means for introducing controlled amounts of air into the mixing chamber 62 in order to control the amount of liquid aspirated into the mixing chamber from the container 16. To this end, the upper portion of the liquid control member 78 is provided with a central vertical bore 94 which communicates with a bore or passage 96 of corresponding size extending downwardly through the flow member 48 into communication with the mixing chamber 62. Communicating with the vertical bore or passage 94 is the rearward end of a horizontally extending bore or passage 98, the forward portion of which is, in turn, communicated with the lower end of an offset vertical passage 100 extending downwardly from the upper end of the liquid control member 78. The extremity of the horizontal bore or passage 98 is closed by means of a cylindrical plug portion 102 formed on a member 104 mounted on the forward central portion of the liquid control member 78.

The amount of air that can enter the upper end of the passage 100 is controlled by a disk valve member 106, the lower surface of which is accurately machined to rotatably engage the upper correspondingly machined surface of the liquid control member 78. This valve member 106 is mounted for rotation on the upper end of the member 74 by any suitable means, such as a bolt 108 having its lower extremity internally threadedly engaged within a counterbore 110 formed in the central upper portion of the member 74. The disk valve member 106 is provided with a central opening which is journalled on the smooth cylindrical portion of the bolt 108 and is resiliently urged into abutting engagement with the member 74 by any suitable means, such as a coil spring 112 mounted in surrounding relation to the bolt 108 between the head thereof and a suitable washer 114 engaging the upper surface of the disk valve member 106.

Formed in the valve member 106 is a plurality of circumferentially spaced openings 116, each of which is provided with a counterbore 118 at its lower end. Preferably, there are an even number of openings 116 provided so that when any one of the openings is disposed in alignment with the vertical offset passage 100, the disk valve member can be resiliently retained in such position by suitable indexing means, preferably in the form of a ball 120 adapted to resiliently engage within the counterbore 118 associated with the opening disposed in diametrically opposed relation to the opening communicating with the passage 100. The ball 120 is mounted for vertical movement in a bore 122 extending downwardly in the member 74 in registering diametrically opposed relation to the passage 100. The ball 120 is adapted to extend above the upper surface of the member 74 to enter the associated counterbore 118 and is resiliently urged into such position by any suitable means, such as a coil spring 124 mounted within the bore 122 between the lower end thereof and the ball 120.

The openings 116 vary in size so that by bringing a desired one of the openings into registering communication with the passage 100, the amount of air which can flow into the mixing chamber is limited. Preferably, suitable indicia in the form of numbers 126, are formed on the upper surface of the disk valve member in association with the respective openings 116. The member 104 is provided with an upwardly extending pointer portion 128 to provide an indication of which numbered opening is in registering communication with the passage 100. In order to increase the range within which the amount of liquid aspirated from the container into the mixing chamber can be varied by adjustment of the disk valve member, there is provided a liquid restricting element 130. The element 130 is provided with a through bore or passage 132 which is of a size less than the size of the passages 88 and 90. As shown in FIGURE 4, the element 130 includes a portion of reduced diameter which is adapted to be engaged within the upper end of the tube 82 when it is desired to aspirate a minimum amount of liquid from the container 16. Where a maximum of liquid is desired to be aspirated from the container, the element 130 is removed from the position shown in FIGURE 4 to a storage position. To this end, the stem portion of the element 130 is exteriorly threaded for engagement within a threaded bore 134 formed in the upper portion of the liquid control member 74.

*Operation*

The spraying device of the present invention is particularly suited for home use in spraying liquid insecticides, liquid fertilizers and the like. Liquid treating chemicals of this type adapted to be mixed and sprayed with a stream of water are well-known. The sprayer device of the present invention provides an effective means for accurately metering the amount of liquid which is to be mixed with the water per unit volume of water. As previously indicated, the hose nozzle 12 provides a convenient means whereby the operator may grasp and support the sprayer device. The hose nozzle is adapted to be connected through conventional hose with a suitable source of water under pressure, such as a house water outlet or the like, and when so connected depression of the trigger or handle 40 will permit the water under pressure to flow through the sprayer head 14. The restricted passage 50 in the water flow member 48 of the head serves to increase the velocity of the water so that when it passes into the mixing chamber 62 a vacuum or negative pressure is created therein at the portion wherein the passages 90 and 96 communicate with the mixing chamber. The value of the vacuum or liquid pressure created in the mixing chamber is dependent upon the velocity of flow through the restricted passage 50. The greater the flow through the passage, the greater suction is created to aspirate the liquid from the container 16.

The utilization of different liquid treating chemicals requires different liquid-to-water mixtures, and these different mixing proportions are obtained by the present spraying device through suitable adjustment of the disk valve member 106 and the utilization of the flow restricting element 130. Normally, the proper liquid-to-water proportion of the liquid treating chemicals is given in terms of either teaspoons or tablespoons of liquid per gallon of water. Accordingly, the numerical indicia 126 on the upper surface of the valve are calibrated to designate teaspoons when the flow restricting member 130 is disposed in the position shown in FIGURE 4, and tablespoons when the flow restricting member is disposed in its storage position. When it is desired to aspirate one teaspoon per gallon of water, the flow restricting element 130 is disposed in the position shown in FIGURE 4 and the disk valve member 106 is moved into the position shown in FIGURE 2. It will be noted that the opening 116 associated with the numeral 1 is relatively large, thus permitting a relatively large flow of air into the mixing chamber through passages 100, 98, 94 and 96. It can be seen that the vacuum created by the passage of water into the mixing chamber will aspirate air through the opening 116 as well as liquid through the restricted passage 132 and into the mixing chamber. The mixing of air into the water stream has a decidedly beneficial effect to the spray issuing from the discharge opening 64 and permits greater dispersion and penetration to the objects being sprayed.

It can thus be seen that the openings 116 associated with the numerals 2, 3, 4, etc., are proportionately reduced in size so that when the disk valve member 106 is moved into positions to register these numbers respectively with the pointer portion 128, proportionately less air will be aspirated into the mixing chamber and hence a proportionately greater amount of liquid will be aspirated therein.

When it is desired to aspirate liquid into the mixing chamber of an amount equivalent to a given number of tablespoons per gallon of water, the flow control element is moved into its storage position so that the passage communicating the liquid with the mixing chamber is increased to a fixed amount. Under these circumstances, when the disk valve member 106 is moved into the position shown in FIGURE 1, a greater amount of liquid will be aspirated into the water stream, such amount being equal to approximately one tablespoon per gallon. Here again, by moving the disk valve member 106 into positions wherein the pointer portion 128 registers with the numerals 2, 3, 4, etc., the amount of liquid aspirated into the water stream will be varied, as before, to provide two tablespoons per gallon, three tablespoons per gallon, etc.

As indicated above, the vacuum or negative pressure created in the mixing chamber will vary in accordance with the variations in the velocity of flow through the restricted passage 50. However, the negative pressure created does not necessarily vary in direct proportion to the velocity of flow in the passage 50. For this reason, the accuracy of the above calibration can be detrimentally affected where substantial variations in the flow velocities in the passage 50 are encountered, as a result of variations in the pressures of the water source. For example, where the water source is 20 p.s.i., the passages 116, 88 and 32 may be so sized as to achieve accurate proportions of liquid-to-water as designated by the numerical indicia 126. If the water source is increased to 40 p.s.i., there may be a considerable reduction in the amount of liquid mixed into the water stream as compared with the amount designated by the indicia. Such variations in the pressures in the water source are not unusual, particularly with respect to different water sources provided in different sections of the country.

One of the significant features of the present invention is the provision of means for reducing the inaccuracies which may occur as a result of variation in the pressures of the water source. This result is obtained by the provision of the insert element 56. Briefly, this element has the effect of limiting the amount of fluid energy which can pass through the passage 50 either in the form of velocity head or energy or pressure head or energy. Once a predetermined minimum pressure is attained in the water downstream from the insert element, an increase in this pressure will not result in any substantial change in the velocity of flow through the passage 50. One possible explanation of this phenomena can be understood by considering the fluid energies involved in accordance with Bernoulli's theorum, which, briefly stated, sets forth that in steady flow the total head or energy (that is, pressure head plus potential head plus velocity head) at any section is equal to the total head at any further section in the direction of flow plus the lost head between these sections. Thus, neglecting potential head or energy, if the water source were communicated directly with the passage 50, any increase in the pressure of the source would result in an increase in the velocity of flow through the passage. By providing a restricted orifice 58 smaller than the passage 50 through which the water must pass before it reaches the passage 50 and an effective expansion chamber defined by the shoulder 54 and counterbore 52 between the orifice and the passage, such increase in the velocity in the passage 50 is limited when the pressure of the water source increases above a predetermined value. Such increase will result in the dissipation of the energy by turbulence within the expansion chamber 54.

While the scientific accuracy of the above explanation has not been positively determined, tests have shown that the precise positioning of the insert within the counterbore 52 is of critical importance to the obtaining of the present results. If the insert is either too close or too far away from the passage 50, the desired limiting effect is not necessarily obtained. Presumably this can be explained by considering that where the restricted orifice 58 is too close to the passage 50 there will be little dissipation of energy since the water will flow almost directly from the orifice 58 into the passage 50 as velocity head or energy. Where the insert is disposed too far away from the passage 50, the pressure energy within the expansion chamber can be built up in response to increases in the velocity of the flow passing through the orifice 58 and this increase in the pressure in the expansion chamber will result in an increase in the velocity of flow in the passage 50. Tests have shown that when the insert member is properly positioned within the counterbore there will be no substantial increase in the velocity of flow in the passage 50 in response to an increase in the pressure of the water source above a predetermined value. Apparently, the orifice 58 is of such size and far enough away from the passage 50 so that the flow from the orifice can not directly pass through the passage 50 but rather, there is an increasing loss in energy due to turbulence. On the other hand, the orifice 58 is close enough to the passage 50 so that this same turbulence will prevent a build-up in the pressure energy of the liquid in the expansion chamber. Thus, the expansion chamber is so shaped and so related to the restricted orifice 58 and restricted passage 50 so as to prevent any substantial increase in the water flow velocity through the passage 50 in response to an increase in the pressure of the water source above a predetermined value either as a result of increased velocity head or energy in the water passing from the orifice through the expansion chamber or of increased pressure head or energy built up in the expansion chamber in response to such increase. While the present invention is not limited to any particular dimension, due to the critical relationships involved for any particular arrangement, one example of dimensions proven in operation to obtain the above results is set forth below.

The hose nozzle 12 is of a size to connect with a conventional garden hose and is dimensioned the same as the gun type hose nozzle produced by The Gilmour Manufacturing Co. under the trade name "Hosemaster." The diameter of the mixing chamber 62 is .1285 inch, the passage 50 has a diameter of .098 inch, the counterbore 52 has a diameter of .250 inch with the shoulder being formed by a conventional twist drill, the insert member 56 has an outside diameter of a size to shrink fit into the counterbore 52 and has an axial thickness of .155 inch, the opening 58 is .1065 inch and is countersunk approximately half way back along the surface 60 at approximately a 45° angle, the insert member is spaced from the outer circle of the shoulder .03125 inch, and the openings 88 and 90 are .037 inch. The openings 116 and 132 are dimensioned to give the desired mixture ratios mentioned above corresponding to the numerical indicia 126 shown in FIGURE 2 either in teaspoons per gallon or tablespoons per gallon.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:
1. A device for mixing a liquid treating chemical into a stream of water under pressure and discharging the mixture as a spray comprising a sprayer body having a discharge end through which the stream of water with said liquid treating chemical mixed therein issues and an inlet end arranged to be communicated with a source of water under pressure, means within said body between said discharge end and said inlet end defining a restricted passage, means within said body defining a mixing chamber of greater cross-sectional area than said restricted passage communicating directly with said restricted passage between the latter and said discharge end for creating a suction in response to the passage of water under pressure from said restricted passage therethrough, means defining a liquid treating chemical passage communicating with said mixing chamber for directing a stream of liquid treating chemical from a source of such liquid treating chemical into said mixing chamber in response to the creation of a suction therein, and means within said body between said restricted passage and said inlet end defining a restricted orifice and an expansion chamber of a cross-sectional configuration greater than said restricted orifice and said restricted passage communicating directly between said restricted orifice and said restricted passage for preventing any substantial increase in the water flow velocity in said restricted passage in response to an increase in the pressure of said water source above a predetermined value sufficient to create said suction within said mixing chamber by preventing any substantial increase in either the velocity energy of the water passing from said orifice through said expansion chamber or in the pressure energy of the water in said expansion chamber in response to such increase in the pressure of said water source.

2. A device as in claim 1 wherein said means defining said restricted orifice and said expansion chamber includes a bore in said body coaxial with said restricted passage and a tubular insert disposed coaxially in said bore.

3. A device as defined in claim 1 further comprising means for communicating said mixing chamber with the atmosphere so that the suction created therein will cause air to be drawn into the mixing chamber in addition to the liquid to be sprayed.

4. A device as defined in claim 3 including means for varying the amount of air drawn into the mixing chamber, said air varying means comprising passage means formed in said sprayer body communicating at one end with the exterior of said body and at an opposite end with said mixing chamber, a disk member rotatably mounted on said sprayer body, said disk member having a plurality of circumferentially spaced openings of a varying size less than the size of said passage means extending therethrough, and means for yieldingly retaining said disk member in a plurality of different positions of rotary movement wherein each of said openings is in registering alignment with said one end of said passage means.

References Cited by the Examiner
UNITED STATES PATENTS

| 2,399,081 | 4/46 | Vose | 239—348 |
| 2,543,294 | 2/51 | McCabe | 239—344 |
| 2,571,871 | 10/51 | Hayes | 239—318 |
| 2,788,245 | 4/57 | Gilmour | 239—73 |
| 2,789,010 | 4/57 | Dean | 239—310 |
| 2,827,329 | 3/58 | Bullock | 239—347 |
| 2,908,227 | 10/59 | McDougall | 239—310 |
| 2,991,939 | 7/61 | Packard | 239—310 |
| 2,993,651 | 7/61 | Packard | 239—354 |
| 3,042,314 | 7/62 | Packard et al. | 239—310 |

EVERETT W. KIRBY, *Primary Examiner.*

ROBERT A. O'LEARY, ERNEST A. FALLER, JR., LOUIS J. DEMBO, EDWARD J. MICHAEL,
*Examiners.*